(12) United States Patent
Wilkinson et al.

(10) Patent No.: US 11,482,934 B2
(45) Date of Patent: *Oct. 25, 2022

(54) RESONANT CONVERTER HAVING MULTIPLE TRANSFORMERS AND A PARALLEL INDUCTOR

(71) Applicant: EXCELSYS TECHNOLOGIES LTD, Cork (IE)

(72) Inventors: Jonathan James Wilkinson, Cork (IE); Diarmuid Hogan, Cork (IE)

(73) Assignee: EXCELSYS TECHNOLOGIES LIMITED, Cork (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/163,465

(22) Filed: Jan. 31, 2021

(65) Prior Publication Data

US 2021/0152091 A1 May 20, 2021

Related U.S. Application Data

(63) Continuation of application No. 15/344,419, filed on Nov. 4, 2016, now Pat. No. 10,972,011.

(30) Foreign Application Priority Data

Nov. 6, 2015 (EP) .................................... 15193487

(51) Int. Cl.
*H02M 3/335* (2006.01)
*H02M 3/337* (2006.01)
(Continued)

(52) U.S. Cl.
CPC ....... *H02M 3/33507* (2013.01); *H02M 3/337* (2013.01); *H02M 1/0058* (2021.05); *H02M 1/0096* (2021.05); *H02M 3/285* (2013.01)

(58) Field of Classification Search
CPC .. H02M 3/33507; H02M 3/337; H02M 3/285; H02M 1/0096; H02M 1/0058
See application file for complete search history.

(56) References Cited

U.S. PATENT DOCUMENTS

| 4,525,774 A | * | 6/1985 | Kino | .................. | H02M 3/3378 |
| | | | | | 363/37 |
| 2006/0139977 A1 | | 6/2006 | Oicles et al. | | |
| 2010/0097826 A1 | | 4/2010 | Xu et al. | | |

FOREIGN PATENT DOCUMENTS

| EP | 2966764 A1 | 1/2016 |
| WO | 2015071842 A1 | 5/2015 |

OTHER PUBLICATIONS

Bong-Ch Ul Kim et al.: "LLC series resonant converter with auxiliary circuit for hold-up time", International Telecommunications Energy Conference; Korea, Oct. 18-22, 2009, IEEE, Oct. 18, 2009, pp. 1-4.

(Continued)

*Primary Examiner* — Nguyen Tran

(57) ABSTRACT

The invention provides a series resonant LLC power converter unit to provide a plurality of power outputs. The power converter unit comprises a plurality of transformers arranged such that at least one primary winding of each transformer is connected in parallel and configured to provide a power output. An inductive element is positioned in parallel with at least one primary winding selected from said plurality of transformers, wherein the inductive element restricts variation in inductance for said plurality of transformers and power outputs in operation.

15 Claims, 4 Drawing Sheets

(51) Int. Cl.
*H02M 3/28* (2006.01)
*H02M 1/00* (2006.01)

(56) References Cited

OTHER PUBLICATIONS

Extended European Search Report for EP Application No. 16197404.
3, dated Feb. 8, 2022; 7 pages.

* cited by examiner

RESONANT CONVERTER HAVING MULTIPLE TRANSFORMERS AND A PARALLEL INDUCTOR

CLAIM OF PRIORITY UNDER 35 U.S.C. § 120

The present Application for Patent is a Continuation of patent application Ser. No. 15/344,419 entitled "LLC Resonant converter having multiple transformers and a parallel inductor" filed 11 Nov. 2016, pending, and assigned to the assignee hereof and hereby expressly incorporated by reference herein, which claims priority to and the benefit of European Patent Application No. EP 15193487.4 filed Nov. 6, 2015, the entire content of this application being incorporated herein by reference for all purposes.

FIELD

The invention relates to LLC resonant converters. In particular the invention relates to multiple converters or LLC transformers arranged in parallel.

BACKGROUND

In 'configurable' power supply converters providing multiple outputs, there may be a single stage providing unregulated power to multiple isolating transformers or multiple regulated converters each with its own transformer. Furthermore, with multiple LLC isolating transformers, the problem is maintaining resonance over varying magnetising inductance due to the varying quantity of parallel isolating transformers.

In the single stage unregulated case, there is no 'hold up' gain phenomenon in the event of loss of AC supply. The provided voltage falls away proportionally to the supply bus voltage.

In the case of multiple converters, there is much duplication of circuitry. Each transformer has associated a complete separate converter circuit.

A further problem with multiple transformers is the difficulty in regulating multiple bus voltages across one or more isolation barriers. This can be achieved with multiple feedback loops making the control circuitry extremely complex. This would also demand multiple 'across-the-barrier' components, such as optoisolators, which can make safety requirements more difficult to meet.

Various power transformer architectures with multiple parallel transformers are used in many power converter topologies are known in the art such as US patent publication US 2006/139977, PCT patent publication number WO 2015/071842 and US patent publication US2010/097826. For example US 2006/139977 discloses an inductor placed in series with a winding of a high voltage transformer. The function of the inductor is to simply change the voltage level.

WO2015/071842 discloses converter and transformer circuits that work alternately and are disconnected using a number of switches for each transformer depending on which output is required. However this is a complicated circuit because of the requirement of switches for each transformer and a dedicated control circuit for each switch.

In addition, prior art converters have either multiple primary switching stages, multiple primary resonant circuits or multiple secondary resonant circuits. The connection of primary windings in series limits the configurability of the converter. FIG. 1 illustrates a prior art schematic of an LLC converter with two transformers connected in parallel, however this type of converter suffers from the same resonance problem described above.

It is therefore an object to provide an improved LLC Resonant converter having multiple transformers.

SUMMARY

According to the invention there is provided, as set out in the appended claims, a series resonant LLC power converter unit to provide a plurality of power outputs, said power converter unit comprising a plurality of transformers arranged such that at least one primary winding of each transformer is connected in parallel and configured to provide a power output; and an inductive element positioned in parallel with at least one primary winding selected from said plurality of transformers, wherein the inductive element and primary winding restricts variation in inductance for said plurality of transformers and power outputs.

In another embodiment there is provided a power converter unit, of the series resonant LLC converter type, said power converter comprising a plurality of transformers arranged such that at least one primary winding of each transformer is connected in parallel; and an inductive element is positioned in parallel with the at least one primary winding of said plurality of transformers.

In one embodiment the inductive element comprises an inductor.

In one embodiment the inductive element comprises a winding of a transformer.

In one embodiment the inductive element comprises a resonant circuit.

In one embodiment the inductive element placed in parallel with the primary is configured to restrict the variation of the inductance loading the unit in the event of the number of transformers changing and a lower control frequency is fixed.

In one embodiment the inductive element placed in parallel with the primary is configured to restrict the variation of the inductance loading the unit in the event of the number of transformers changing and the lower control frequency is set by a control circuitry to be responsive to the number and expected throughput power of connected transformers.

In one embodiment at least one of said plurality of transformers comprise part of field-removable or replaceable assemblies.

In one embodiment there is provided a control circuit adapted to control operation of the inductive element.

In one embodiment the control circuit is adapted with a secondary winding of a transformer to control the inductive element.

An aspect enables a multiple output ac/dc converter to be realised using a single primary switching and resonant stage.

Another aspect of the application is a discrete parallel inductor (or transformer primary winding) which limits the variation in the resonant characteristics in order to realise multiple transformers in an LLC resonant converter.

Another aspect of some implementations is at least one of said plurality of transformers comprise part of field-removable or replaceable assemblies.

In one embodiment the invention implements a method of controlling the LLC regulation of multiple bus voltages by means of a transformer with primary winding (the primary winding inductance of the transformer now serving as a parallel inductor) coupled to a control winding which generates a voltage that is be used to regulate the operating frequency of the LLC half-bridge topology over various load and line conditions. This also means no 'across-the-barrier' components are necessary and reduces the complexity of the control methodology significantly.

In another embodiment there is provided a method of controlling the LLC regulation of power converter unit, of the series resonant LLC converter type, said power converter comprising a plurality of transformers arranged such that at least one primary winding of each transformer is connected in parallel, said method comprising the step of positioning an inductive element in parallel with the at least one primary winding of said plurality of transformers.

In another embodiment there is provided a method of controlling the LLC regulation of a series resonant LLC power converter unit to provide a plurality of power outputs, said power converter comprising a plurality of transformers arranged such that at least one primary winding of each transformer is connected in parallel, said method comprising the step of positioning an inductive element in parallel with at least one primary winding of a transformer selected from said plurality of transformers; and restricting variation in inductance for said plurality of transformers and power outputs using said single inductive element.

In a further embodiment there is provided a power converter unit, of the series resonant LLC converter type, said power converter comprising a plurality of transformers arranged such that at least one primary winding of each transformer is connected in parallel; an airgap positioned in the core of the at least one transformer which can be dimensioned to perform the same function as the aforementioned parallel inductor.

There is also provided a computer program comprising program instructions for causing a computer program to carry out the above LLC converter frequency control method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
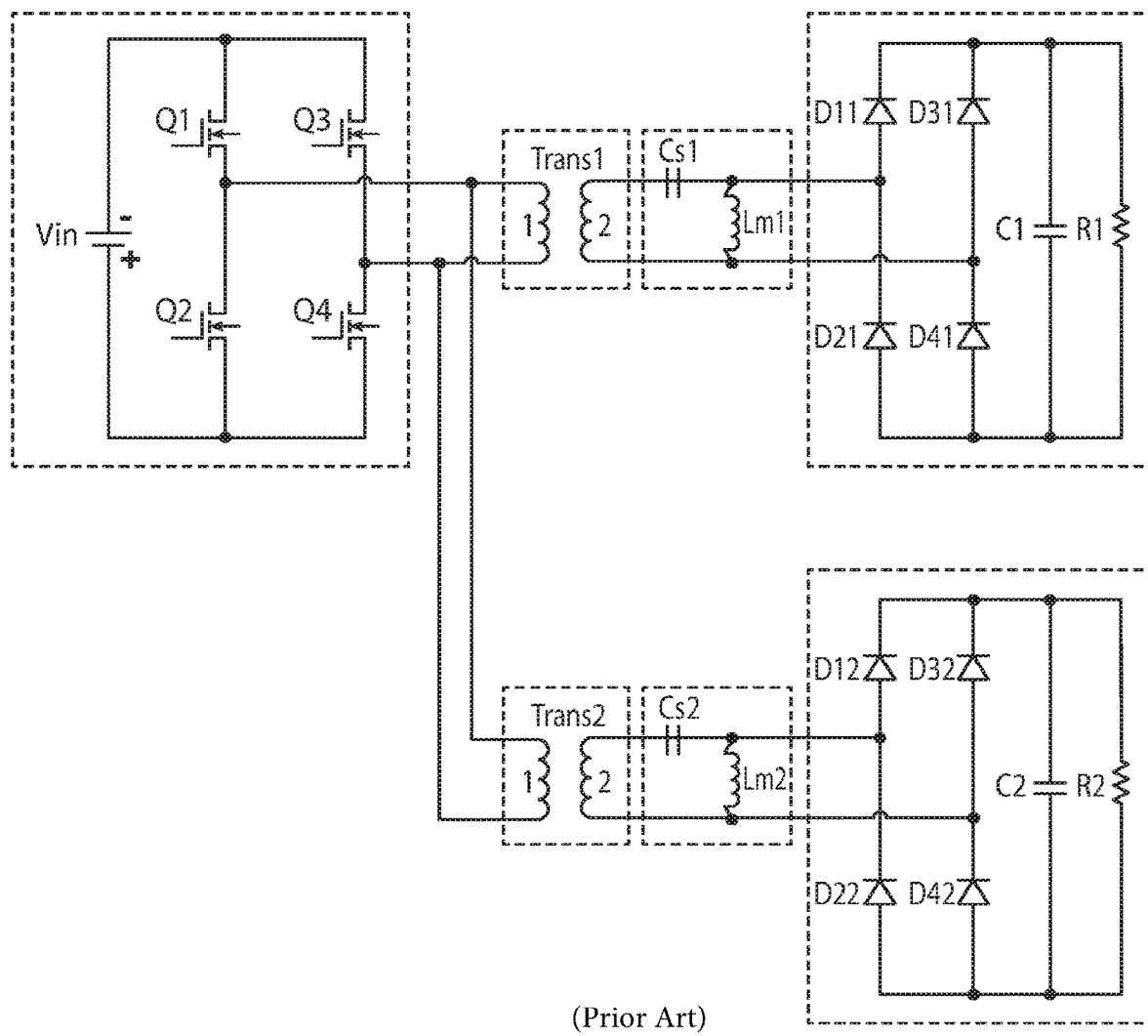
FIG. 1 illustrates a prior art schematic of an LLC convertor with two transformers connected in parallel.

In order to realise an ac/dc power supply with multiple outputs, several transformer primaries can be connected in parallel and driven from a single half bridge switching network and LLC resonant circuit. Such a prior art unit is illustrated in FIG. 1.

In one example, for the application of configurable or multiple output power supplies, a unit can be configured to deliver from one to six power outputs or more necessitating a separate transformer, rectifier stage and output filter for each one. It will be appreciated more or less than six outputs can be embodied depending on the application.

Figure 2:
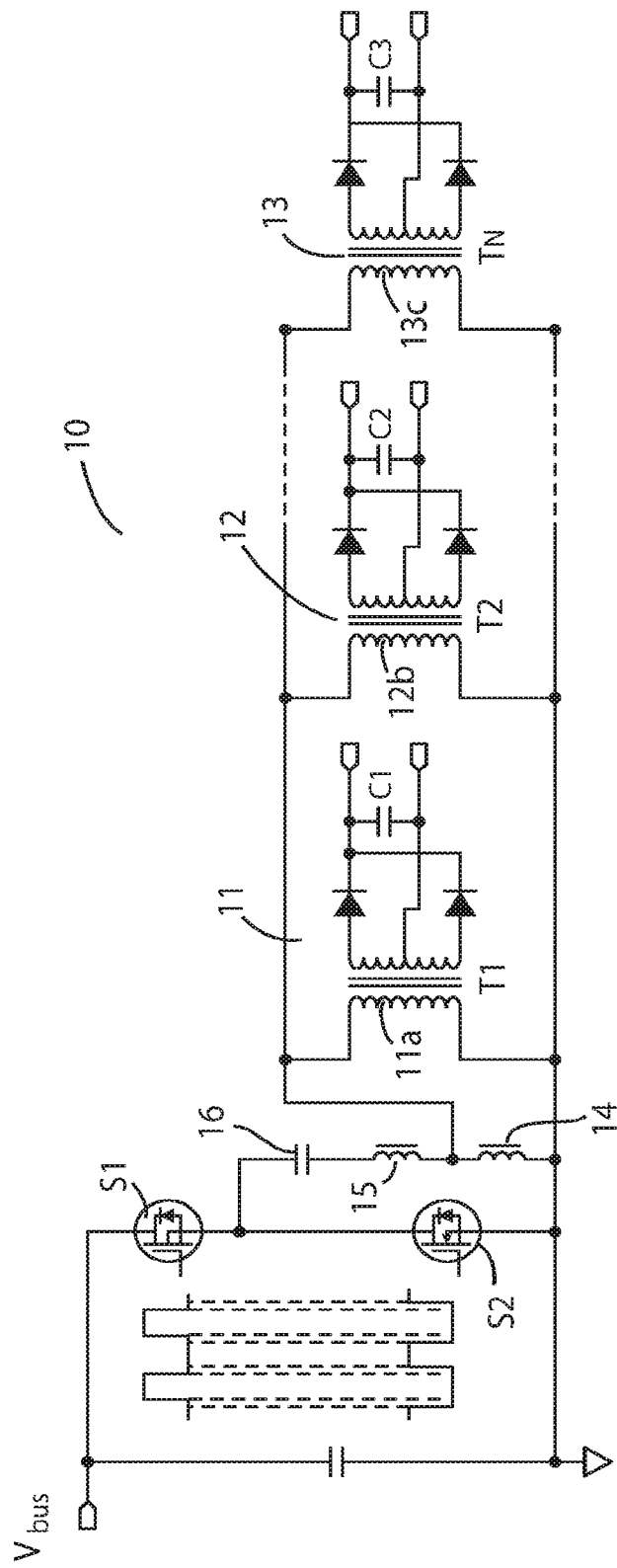
FIG. 2 illustrates a schematic of one embodiment of the converter with parallel inductor only, according to the invention.

FIG. 2 illustrates a schematic of one embodiment of the converter with parallel inductor only, according to the invention. FIG. 2 shows a power converter unit, of the series resonant LLC converter type, indicated generally by the reference numeral 10 comprising a plurality of transformers 11, 12 and 13 arranged such that at least one primary winding of each transformer 11a, 12b, 13c are connected in parallel. An inductive element 14 placed in parallel with one of the primary windings 11a, 12b, 13c. The inductive element 14 can be an inductor or a primary winding of a transformer. The inductive element 14 can be construed to mean any element in which voltage and current are not in phase with each other.

Embodiments permit the voltage regulation of the rectified outputs from multiple transformers during brief interruption to the supply using only one controlled converter. The regulation performance of the circuit is controlled by the addition of the parallel single inductor, 14, which limits the variation of transformer magnetising inductance loading a series resonant tank provided by inductor 15 and capacitor 16 which increases the gain obtainable for hold-up requirements. In this way only a single inductor element 14 is required to provide stable operation for multiple power outputs.

The variation in the characteristics of the resonant circuit is reduced by connecting a single discrete inductor 14 (or primary of a gapped core transformer) in parallel with the primary windings. The inductor can also serve to increase the gain which can be obtained when the control circuit acts to decrease the switching frequency during hold-up.

The design incorporating the parallel inductor 14 enables the design of an ac/dc converter which utilises a single half bridge switching network and primary resonant LLC circuit to drive multiple transformers with the primaries connected in parallel. Each transformer secondary is rectified and filtered separately. As a result a plurality of isolated outputs can be realised from a single half bridge and resonant circuit. This configuration allows several combinations of outputs to be realised from a single primary stage. The isolated outputs can be connected in series and parallel. The variation in resonant circuit characteristics is minimised by connecting the discrete inductor 14 (this inductor can also be realised by means of a transformer primary winding) in parallel with the primary of each transformer 11c, 12c, 13c arranged in parallel.

Referring again to FIG. 2, in operation the supply Vbus is switched alternately for equal lengths of time by semiconductor switches S1 & S2 with a small amount of 'dead' time between the intervals during which the switches are turned on.

In the normal operating condition, the frequency of switching of S1 & S2 is made to be equal to the series resonant frequency of the LC network made up of inductor element 15 and capacitor 16. Under this condition the effective voltage gain of the circuit from the switching node of S1, S2 to the parallel combination of transformer primary windings (T1 . . . TN) is unity and independent of the number of connected transformers.

Figure 3:
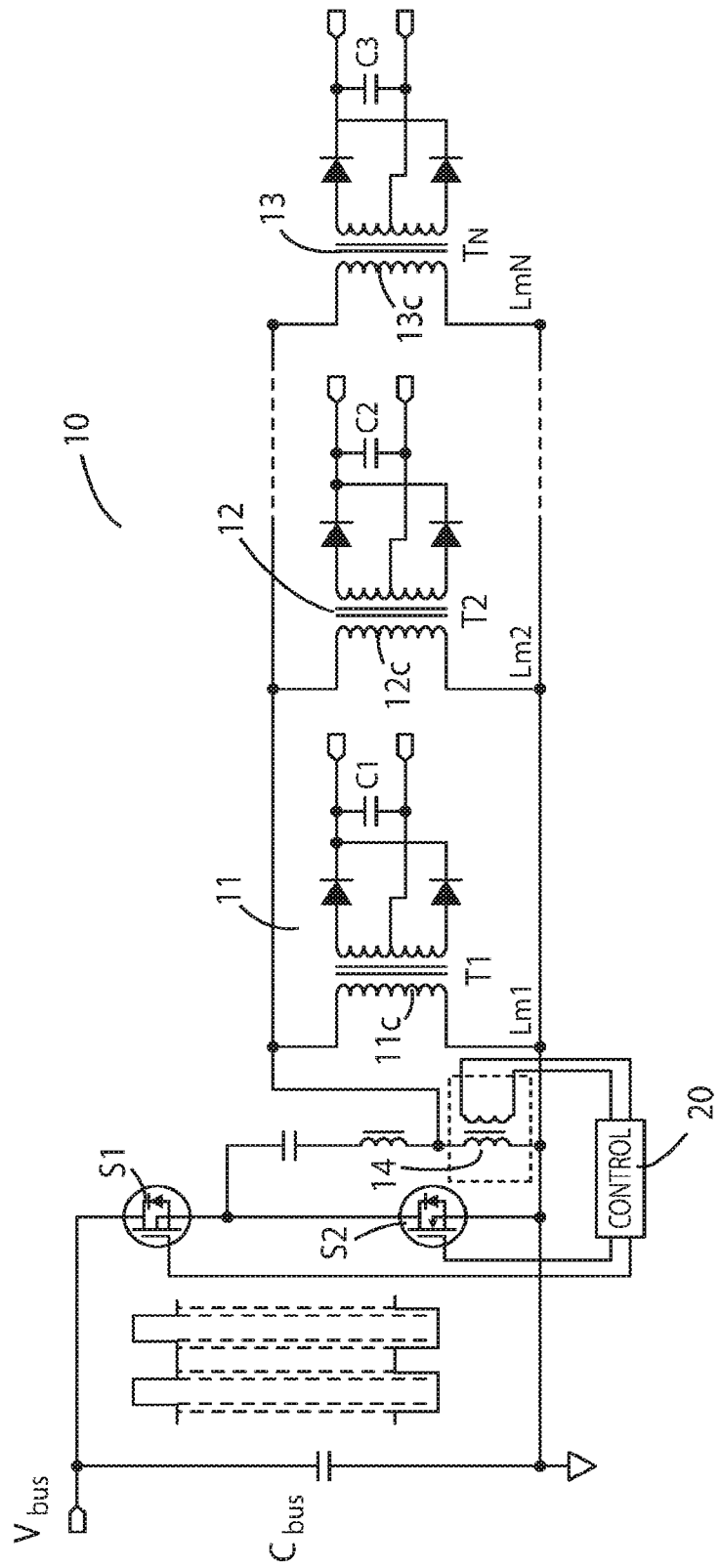
FIG. 3 illustrates a schematic diagram of the general embodiment of the converter with transformer with control winding replacing the parallel inductor.

During interruption of input supply, energy is drawn from capacitor Cbus and the voltage across the supply falls. Control circuitry 20 is used to reduce the operating frequency to permit an increase in voltage gain to keep the output voltage substantially constant. This is illustrated in FIG. 3. The control circuit 20 will vary the operating frequency by closed loop control of the voltage appearing on the control winding of transformer or inductor 14 or by changing operating frequency to one of a range of digitally stored values as directed by a computer program.

The addition to the circuit of parallel inductor 14 limits the variation of magnetising inductance due to number and inductance tolerance of parallel-connected transformers.

Figure 4:
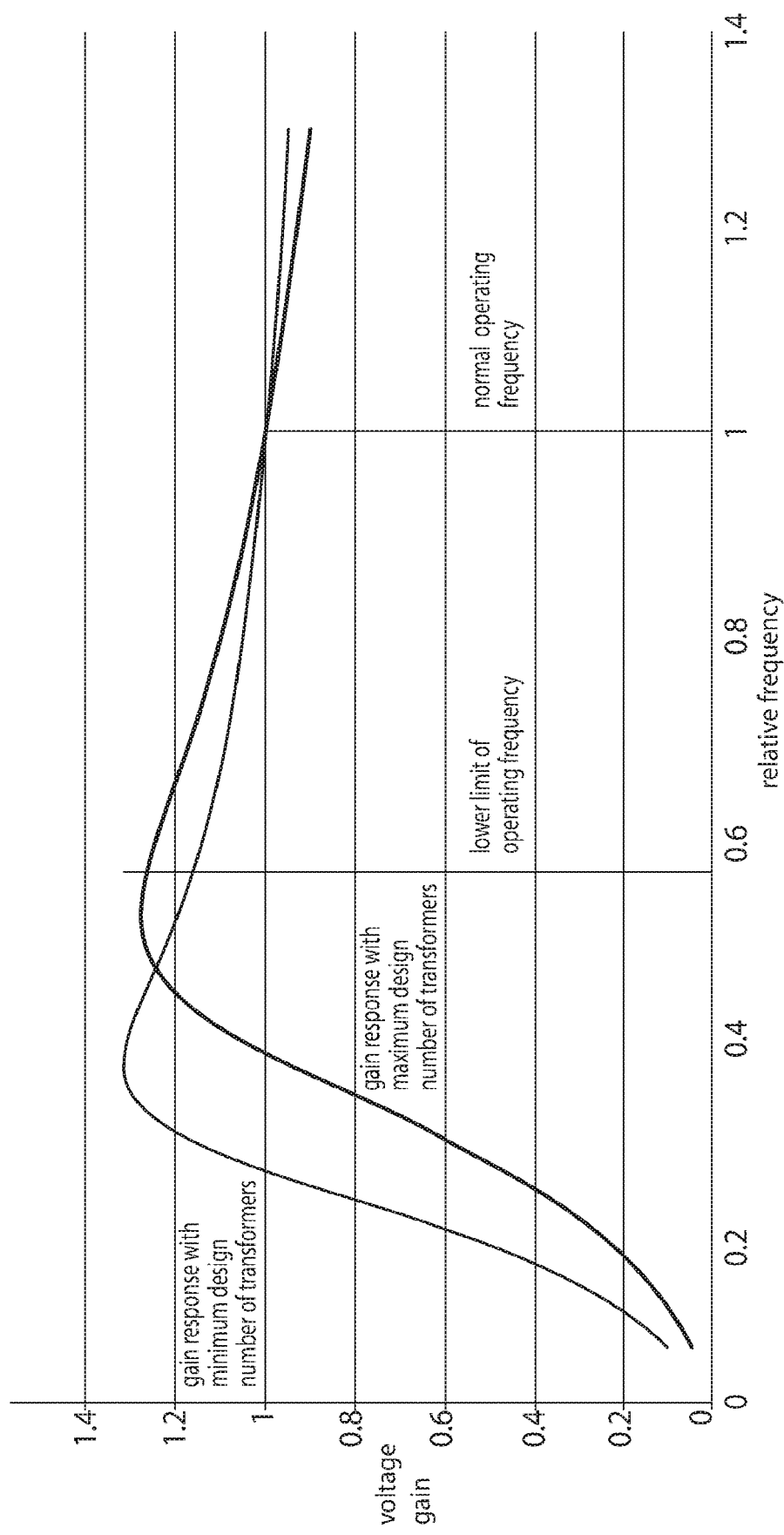
FIG. 4 illustrates Frequency vs gain graphs showing the behaviour of the converter.

FIG. 4 illustrates frequency vs gain graphs showing the behaviour of the converter. Gain responses for maximum and minimum number of transformers at rated load are shown. Under normal operating conditions, the operating frequency is chosen to be the resonant frequency of network (inductor element 15 and capacitor 16). The voltage applied to the primary windings of the transformers is then independent of the number of transformers used.

When the input voltage reduces, the operating frequency is reduced to make use of circuit gain to continue to regulate the primary winding voltage. The lower frequency limit shown may be fixed or may be varied responsively to the number of transformers in use to maximise the gain effects.

The LLC converter frequency control method described and illustrated in FIG. 3 may be realized using a computer apparatus and/or processes performed in a computer apparatus. However, the LLC converter control method described in the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A series resonant LLC power converter unit to provide a plurality of power outputs, said power converter unit comprising:
    a plurality of transformers wherein each of the transformers is configured to provide a power output and the plurality of transformers are arranged so at least one primary winding of each transformer is connected in parallel;
    an inductive element positioned in parallel with at least one primary winding of said plurality of transformers, wherein the inductive element and the at least one primary winding restricts variation in inductance for said plurality of transformers and power outputs;
    a control circuit configured to control an operating frequency of the inductive element through closed loop control of voltage appearing on the inductive element;
    wherein the inductive element placed in parallel with the at least one primary is configured to restrict the variation of an inductance loading of the power converter unit in the event of the number of transformers changing and a lower control frequency is fixed.

2. The power converter unit of claim 1 wherein the inductive element comprises an inductor.

3. The power converter unit of claim 1 wherein the inductive element comprises a winding of a transformer.

4. The power converter unit of claim 1 wherein the inductive element comprises a resonant circuit.

5. The power converter unit of claim 1 wherein the inductive element placed in parallel with the at least one primary is configured to restrict the variation of the inductance loading of the power converter unit when the number of transformers changes and a lower control frequency is set by the control circuit.

6. The power converter unit of claim 1 wherein at least one of said plurality of transformers comprise part of field-removable or replaceable assemblies.

7. The power converter unit of claim 1, further wherein the control circuit adapted to set a lower control frequency.

8. The power converter unit of claim 7 wherein the control circuit is adapted with a secondary winding of a transformer to control the inductive element.

9. A method of controlling a series resonant LLC power converter unit to provide a plurality of power outputs, said power converter comprising a plurality of transformers arranged such that at least one primary winding of each transformer is connected in parallel, said method comprising:
    positioning an inductive element in parallel with at least one primary winding of a transformer selected from said plurality of transformers;
    controlling an operating frequency of the inductive element by closed loop control of voltage appearing on said inductive element;
    restricting variation in inductance for said plurality of transformers and power outputs using said inductive element, wherein the inductive element is configured to restrict variation of an inductance loading of the power converter unit when a number of transformers in the plurality of transformers changes; and
    changing an operating frequency of the inductive element when the number of transformers in the plurality of transformers changes and an expected power of the plurality of transformers changes.

10. The method of claim 9, further comprising:
    controlling voltage gain associated with the plurality of transformers to maintain a constant output voltage of the power converter unit.

11. The method of claim 10, wherein controlling the voltage gain causes the power converter to operate approximately at an upper resonance or load independent point of operation.

12. The method of claim 10, wherein controlling the voltage gain causes the power converter to provide a constant ratio-metric relationship of voltage of one or more outputs of the power converter unit.

13. A series resonant power converter unit to provide a plurality of power outputs, said power converter unit comprising:
    a plurality of transformers arranged so at least one primary winding of each transformer is connected in parallel and each of the plurality of transformers is configured to provide a power output, wherein at least one of the plurality of transformers is a field-removable assembly;
    an inductive element positioned in parallel with at least one primary winding of said plurality of transformers, wherein the inductive element and the at least one primary winding restricts variation in inductance for said plurality of transformers and power outputs; and a control circuit configured to change an operating frequency of the inductive element;

wherein the inductive element placed in parallel with the at least one primary is configured to restrict the variation of the inductance loading when a number of transformers changes and a lower control frequency is fixed.

14. The power converter unit of claim 13 wherein the inductive element placed in parallel with the at least one primary is configured to restrict a variation of the inductance loading when a number of transformers changes and a lower control frequency is set by the control circuit.

15. The power converter unit of claim 13 wherein the control circuit is adapted with a secondary winding of a transformer to control the inductive element.

* * * * *